(12) United States Patent
Van Krevel et al.

(10) Patent No.: US 10,927,429 B2
(45) Date of Patent: Feb. 23, 2021

(54) HIGH STRENGTH HOT DIP GALVANISED STEEL STRIP

(71) Applicant: TATA STEEL IJMUIDEN B.V., Velsen-Noord (NL)

(72) Inventors: Joost Willem Hendrik Van Krevel, Beverwijk (NL); Cornelia Ionescu, Beverwijk (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 0 days.

(21) Appl. No.: 16/060,666

(22) PCT Filed: Dec. 15, 2016

(86) PCT No.: PCT/EP2016/081254
§ 371 (c)(1),
(2) Date: Jun. 8, 2018

(87) PCT Pub. No.: WO2017/102982
PCT Pub. Date: Jun. 22, 2017

(65) Prior Publication Data
US 2018/0363082 A1   Dec. 20, 2018

(30) Foreign Application Priority Data

Dec. 15, 2015 (EP) .................................. 15200241
Dec. 17, 2015 (EP) .................................. 15200828

(51) Int. Cl.
*C21D 8/02*  (2006.01)
*C23C 2/40*  (2006.01)
(Continued)

(52) U.S. Cl.
CPC .......... *C21D 8/0247* (2013.01); *B32B 15/013* (2013.01); *C21D 1/19* (2013.01);
(Continued)

(58) Field of Classification Search
None
See application file for complete search history.

(56) References Cited

U.S. PATENT DOCUMENTS

| 2007/0144633 A1 | 6/2007 | Kizu et al. |
| 2008/0175743 A1* | 7/2008 | Futatsuka .............. C21D 6/005 420/120 |

(Continued)

FOREIGN PATENT DOCUMENTS

| CA | 2812703 A1 | 4/2012 |
| CA | 2849285 A1 | 4/2013 |

(Continued)

OTHER PUBLICATIONS

International Search Report and Written Opinion dated Feb. 6, 2017 for PCT/EP2016/081254 to Tata Steel Ijmuiden B.V. filed Dec. 15, 2016.

(Continued)

*Primary Examiner* — Daniel J. Schleis
(74) *Attorney, Agent, or Firm* — Vorys, Sater, Seymour and Pease LLP

(57) ABSTRACT

A high strength hot dip galvanised steel strip consisting, in mass percent, of the following elements: 0.10-0.21% C, 1.45-2.20% Mn, max. 1.50% Si, 0.1-1.50% Al, 0.001-0.04% P, 0.0005-0.005% B, 0.005-0.30% V, max. 0.015% N, max. 0.05% S, and, optionally, one or more elements: max. 0.004% Ca, max. 0.10% Nb, max. 0.50% Cr, max. 0.20% Mo, max. 0.20%, Ni, max. 0.20% Cu, and max. 0.20% Ti the balance of the composition consisting of Fe and inevitable impurities. The steel has good surface finish and increased mechanical strength, in particular high overall strength, ductility and plasticity. It also relates to a process for the manufacture of a high strength hot dip galvanised steel strip and to the products thereof.

36 Claims, 3 Drawing Sheets

Figure 1:
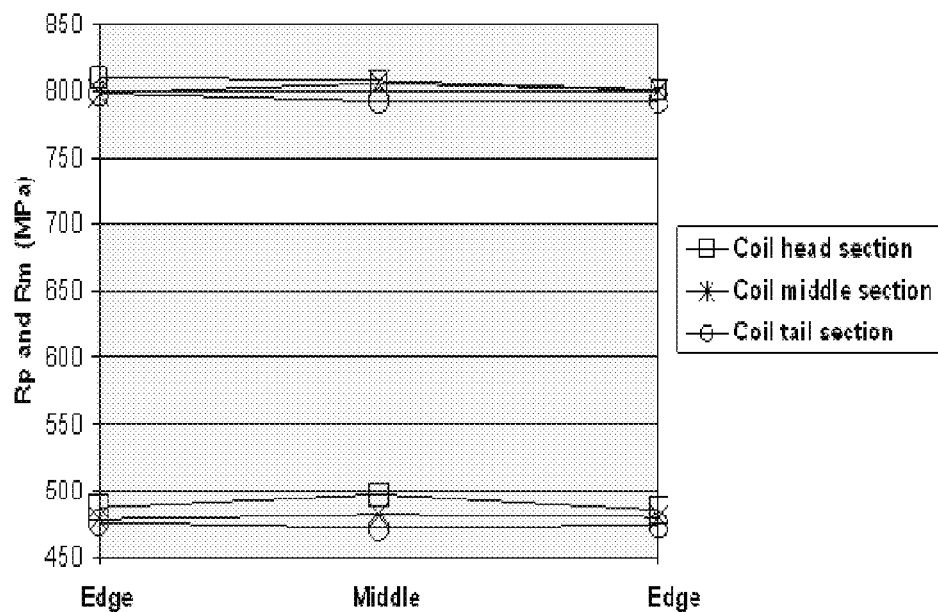

(51) Int. Cl.
*C22C 38/00* (2006.01)
*C22C 38/02* (2006.01)
*C22C 38/04* (2006.01)
*C22C 38/06* (2006.01)
*C22C 38/12* (2006.01)
*C23C 2/02* (2006.01)
*C23C 2/06* (2006.01)
*C23C 2/26* (2006.01)
*C22C 38/54* (2006.01)
*C22C 38/58* (2006.01)
*C22C 38/08* (2006.01)
*B32B 15/01* (2006.01)
*C22C 38/28* (2006.01)
*C22C 38/44* (2006.01)
*C22C 38/38* (2006.01)
*C22C 38/42* (2006.01)
*C22C 38/46* (2006.01)
*C22C 38/16* (2006.01)
*C21D 1/19* (2006.01)
*C22C 38/22* (2006.01)
*C22C 38/50* (2006.01)
*C22C 38/20* (2006.01)
*C22C 38/24* (2006.01)
*C22C 38/14* (2006.01)
*C22C 38/32* (2006.01)

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/28* (2013.01); *C22C 38/32* (2013.01); *C22C 38/38* (2013.01); *C22C 38/42* (2013.01); *C22C 38/44* (2013.01); *C22C 38/46* (2013.01); *C22C 38/50* (2013.01); *C22C 38/54* (2013.01); *C22C 38/58* (2013.01); *C23C 2/02* (2013.01); *C23C 2/06* (2013.01); *C23C 2/26* (2013.01); *C23C 2/40* (2013.01); *C21D 8/0226* (2013.01); *C21D 8/0236* (2013.01); *C21D 8/0268* (2013.01); *C21D 2211/001* (2013.01); *C21D 2211/005* (2013.01); *C21D 2211/008* (2013.01); *Y10T 428/12799* (2015.01)

(56) References Cited

U.S. PATENT DOCUMENTS

2011/0008647 A1 1/2011 Azuma et al.
2012/0288733 A1 11/2012 Ennis et al.
2014/0205858 A1 7/2014 Ennis
2014/0212684 A1 7/2014 Kawata et al.
2016/0002756 A1 1/2016 Takeda et al.
2016/0017472 A1 1/2016 Ennis
2018/0230570 A1 8/2018 Van Krevel et al.

FOREIGN PATENT DOCUMENTS

| CA | 2850101 A1 | 4/2013 |
| CN | 101151392 A | 3/2008 |
| CN | 101960034 A | 1/2011 |
| CN | 102639738 A | 8/2012 |
| CN | 103857808 A | 6/2014 |
| EP | 1867746 A1 | 12/2007 |
| EP | 1867747 A1 | 12/2007 |
| EP | 2103697 A1 | 9/2009 |
| EP | 2524972 A1 | 11/2012 |
| EP | 2653582 A | 10/2013 |
| EP | 2765212 A1 | 8/2014 |
| JP | H05247586 A | 9/1993 |
| JP | 2006307326 A | 11/2006 |
| JP | 2007284776 A | 11/2007 |
| JP | 2010043360 A | 2/2010 |
| WO | 2011076383 A1 | 6/2011 |
| WO | 2011087057 A1 | 7/2011 |
| WO | 2012081666 A1 | 6/2012 |
| WO | 2013018739 A1 | 2/2013 |
| WO | 2013037485 A1 | 3/2013 |
| WO | 2014139625 A1 | 9/2014 |

OTHER PUBLICATIONS

Notification of Transmittal of the International Preliminary Report on Patentability dated Mar. 8, 2018 for PCT/EP2016/081254 to Tata Steel Ijmuiden B.V. filed Dec. 15, 2016.

S.M.C. Van Bohemen, "Bainite and martensite Start Temperature calculated with exponential carbon dependence", Materials Science and Technology, (2012), vol. 28, No. 4, doi:doi:10.1179/1743284711Y.0000000097, pp. 487-495, XP002756629.

Structure-Properties Relationship of Trip assisted Steels by Non-destructive Testing Method, Animesh Talapatra, Jayati Datta, N.R. Bandhyopadhyay, Chemical and Materials Engineering 1(1): 18-27, 2013.

VDA 239-100, Flacherzeugnisse aus Stahl zur Kaltumformung Sheet Steel for Cold Forming, VDA 239-100 Werkstoffblatt/VDA 239-100 Material specification, Jan. 2016.

B.C. De Cooman and J.G. Speer, published by: AIST International®, Association for iron and steel Technology, Chapter 7 Low-Carbon Steel, Sub chapter 7.4.4 High Strength bainitic, ferrite-bainite and complex phase steels, p. 410, Fundamentals of Steel Product Physical Metallurgy, 2007.

* cited by examiner

HIGH STRENGTH HOT DIP GALVANISED STEEL STRIP

CROSS-REFERENCE TO RELATED APPLICATIONS

This is a § 371 National Stage Application of International Application No. PCT/EP2016/081254 filed on Dec. 15, 2016, claiming the priority of European Patent Application No. 15200241.6 filed on Dec. 15, 2015 and European Patent Application No. 15200828.0 filed on Dec. 17, 2015.

The invention relates to a high strength hot dip galvanised steel strip having good surface finish and increased mechanical strength, in particular high overall strength, ductility and plasticity. It also relates to a process for the manufacture of a high strength hot dip galvanised steel strip and to the products thereof.

Over the last decade there is in the automotive industry a continuous need to reduce vehicle weight, and increase the passenger's safety and fuel economy. The response of the steel industry to the new challenges was a rapid development of higher strength steels. Thus, high-strength steels have been proposed. These steels are characterised by improved mechanical properties compared to conventional steel grades and are known under the following generic names: dual phase (DP), transformation induced plasticity (TRIP), TRIP assisted dual phase (TADP) and complex phase (CP) steels. TRIP assisted Dual Phase steel is a dual phase steel with additional ductility through the presence of retained austenite. The correct name would be TRIP assisted multiphase steel as there are more phases including retained austenite but for convenience it is mentioned TRIP assisted Dual Phase in this document.
Complex phase steel is a steel with different phases, normally containing more bainite than dual phase steel, resulting in higher Rp, less ductility but improved stretch flangeability. TRIP assisted steels are for instance known from Animesh Talapatra, Jayati Datta, N. R. Bandhyopadhyay, Chemical and Materials Engineering 1(1): 18-27, 2013. Complex phase steels are for instance known from Fundamentals of Steel Product Physical Metallurgy, 2007, Authors: B. C. De Cooman and J. G. Speer, published by: AIST International®, Association for iron and steel Technology, Chapter 7 Low-Carbon Steel, Sub chapter 7.4.4 High Strength bainitic, ferrite-bainite and complex phase steels, page 410, and VDA 239-100 Sheet Steel for Cold Forming, VDA-material sheet, published in several years.

The mechanical behaviour of TRIP assisted steels is associated with parameters, such as chemical composition, grain size, stress-state, which are usually coupled, making the microstructure and properties of the steel a very challenging task. Compared to TRIP steels, TRIP assisted steels have a reduced alloying which provide a balance between weldability and dimensional window versus formability. Although there is a huge amount of published work on TRIP assisted steels, it is still quite difficult to define a steel composition having a microstructure, which performs well during forming operations.

The high alloying contents of TRIP assisted steel limits the dimensional window and causes problems during welding, and thus reducing the welding process window.

Leaner alloying is very important in order to minimize welding process limitations, and maximise the dimensional window. Leaner alloying reduces the manufacturing costs, and allows the production of more environmentally friendly steels, since some alloying elements are suspected of being carcinogenic. Leaner alloyed steel compositions have been proposed in the past but the strength of the leaner alloyed steels was insufficient.

It should be noted, that it is very important in the leaner alloyed steels to have good homogeneity over the coil length and width and constant deformation properties in different deformation directions, i.e. longitudinal, transverse and diagonal towards the rolling direction.

It is also very important to have galvanized steels having good galvanising surface quality.

Therefore, there is a need to provide TRIP assisted dual phase alloys having a good balance of strength and ductility.

There is further a need to provide steel strips having improved proof of strength, ultimate tensile strength, total uniform elongation and strain-hardening coefficient (n-value).

There is further a need to provide steel strips having alloying elements low in amount to reduce the cost of the steel.

There is further a need for ease of manufacturing and a good quality coating of the steel strip.

Therefore, the steel strip has to have high strength, good weldability, and exhibit a good surface quality. These requirements are especially important for industrially produced TRIP assisted dual phase steel types, which have to be formed for instance into automotive parts, that will be spot welded or laser welded into a body in white. Alternatively, said parts can be adhesion bonded into the body in white or bonded by any other known method.

Complex phase steels show significantly higher yield strengths at equal tensile strengths. They are characterized by high energy absorption during impact, high residual deformation capacity, good hole expansion, edge ductility and bendability. This is at the expense of formability.

It is also of importance to retain good homogeneity over the coil length and width.

Therefore there is a need to provide a complex phase steel strip with high yield strengths at equal tensile strengths, high energy absorption during impact, high residual deformation capacity, good hole expansion and edge ductility and bendability.

Strength in CP and TADP steel grades can additionally be obtained by precipitation hardening but this limits the dimensional window and often reduces the homogeneity over the coil width and length. Preferably it also has minimum anisotropy of elongation in different directions.

It is therefore an object of the invention to find a high strength hot dip galvanised steel strip composition that strikes a balance between formability and processability of the strip.

It is a further object of the invention to provide a high strength hot dip galvanised steel strip that has a good coatability during hot dip galvanising.

It is still a further object of the invention to provide a high strength hot dip galvanised steel strip that combines a good weldability with improved deformation in different deformation modes, notably under tensile loads.

It is an object of the present invention to provide a TRIP assisted steel, wherein the hard phase morphology gives the strength and TRIP effect, while the soft phase morphology can be optimized with regard to shape deformation in three directions, at 0°, 45° and 90° degrees, compared to the rolling direction.

It is another object of the invention to provide a high strength hot dip galvanised steel strip that has a good surface quality.

It is still another object of the invention to provide a high strength hot dip galvanised steel strip having low amount of alloying elements, consequently a cost price that is as low as possible.

It is a further object of the invention to provide a high strength hot dip galvanised steel strip having a larger dimensional window. Larger dimensional window refers to a higher width and thickness range.

It is a further object of the invention to provide a high strength hot dip galvanised steel strip, wherein the mechanical properties throughout the high strength hot dip galvanised steel strip show as low as possible variation over the coil width and length.

It is a further object of the invention to provide a high strength hot dip galvanised steel strip, wherein the steel strip is a TRIP assisted dual phase steel strip or a complex phase steel strip having the improved properties as described above.

One or more of these objects are met according to the invention by providing a high strength hot dip galvanised steel strip comprising, in mass percent, of the following elements:
- 0.10-0.21% C
- 1.45-2.20% Mn
- max. 1.50% Si
- 0.1-1.50% Al
- 0.001-0.04% P
- 0.0005-0.005% B
- 0.005-0.30% V
- max. 0.015% N
- max. 0.05% S and, optionally one or more elements selected from:
- max. 0.004% Ca
- max. 0.10% Nb
- max. 0.50% Cr
- max. 0.20% Mo
- max. 0.20%, Ni
- max. 0.20% Cu
- max. 0.20% Ti the balance of the composition consisting of Fe and inevitable impurities.

In a preferred embodiment the high strength hot dip galvanised steel strip consists, in mass percent, of the above mentioned elements.

In a preferred embodiment the high strength hot dip galvanised steel strip is a TRIP assisted dual phase steel strip or a complex phase steel strip.

Hot-dip galvanizing means the process of coating a steel strip with a zinc alloy layer carried out in a bath of molten zinc alloy. The coated steel strip obtained according to said process is a hot-dip galvanized steel strip.

The inventors found that by careful selection of the amounts of the main constituting elements of the steel, namely, a high strength hot dip galvanised steel strip can be produced having the desired properties, in particular the required formability, homogeneity, low anisotropy, processability, strength and elongation, and at the same time the desired weldability, coatability and surface quality.

The inventors have especially found that it is advantageous to add boron and vanadium to the steel composition.

The present invention provides a steel composition that has a good formability in combination with good weldability. This is because the composition makes use of boron, which improves the weldability performance through grain boundary segregation.

By adding boron, the hot-rolled intermediate steel product can be cooled fast enough to get a coiling temperature $C_T$ that provides a suitable microstructure for further processing. Moreover, the inventors found that due to the addition of boron the properties of the end products have a high degree of homogeneity and a high strength steel strip can be produced. There is a continuous demand from the industry, in particular automotive industry, to produce high strength steel strips having larger dimensions, i.e. having an expanded gauge range and/or expanded width than those currently produced, while their mechanical properties throughout the three dimensions are retained or even improved.

Boron is known to suppress the ferrite formation during the austenite cooling. This minimises the local carbon enrichment in the strip. Therefore boron is normally avoided, if TRIP assisted steels are manufactured. However, the inventors surprisingly found that boron containing steel compositions according to the present invention result in very good TRIP assisted steel grades, by continuously annealing of the cold-rolled strip in the intercritical region so that ferrite nucleation is not required.

Moreover, the addition of boron improves the hardenability of the steel, resulting in the possibility to use less alloying elements. This results in an improved dimensional window for the steel strip, allowing a higher degree in design to the expanded width and thickness range, while the mechanical properties of the steel over the width of the strip remain within the desired ranges.

Further, boron segregates to the grain boundaries and replaces phosphorus at the grain boundaries, which improves weldability or makes it possible to have a higher phosphorus amount in the steel, while still achieving a good weldability.

The inventors further found that the addition of vanadium to the steel composition is beneficial and that vanadium is a necessary element for the manufacture of a high strength steel strip according to the invention. Vanadium gives precipitation hardening, which results in grain refinement and alloying strengthening. The vanadium precipitate formation occurs during final annealing and not during hot and cold rolling. This results in the desired dimensional window.

Optionally, impurities such as Nb, Cu, Ti but also of other alloying elements can contribute to the precipitate hardening by forming additional or mixed precipitates. Small precipitates give additional strength. But, if the precipitate size is large, the potential hardening of vanadium precipitates is not fully utilized, most particularly when it is intended to manufacture a high strength cold-rolled and annealed steel strip. In the latter case, the inventors have demonstrated that it is necessary to limit the vanadium precipitation at the hot-rolling step in order to be able to more fully utilize the fine precipitation hardening that occurs during a subsequent annealing step. The inventors have surprisingly found that according to the invention in the hot-rolled product no or limited amount of precipitates are present. This can be realized by adding aluminium so that nitride containing precipitates, which have lower solubility, can be avoided in favor of more carbide rich precipitates which have higher solubility. In addition, by limiting vanadium precipitation in the intermediate hot rolled product it is possible to obtain high strength products with an improved dimensional window.

Based on the above the inventors found that the present invention allows a larger dimensional window for hot and subsequent cold rolling. During continuous annealing precipitates are formed and these add to precipitation strengthening. The additional strength allows additional formation of retained austenite in the end product, resulting in an increase of the ductility and hardening while the strength remains above the required 650 MPa.

The reason for the amounts of the main constituting elements is as follows.

C: 0.10-0.21 mass %. Carbon has to be present in an amount that is high enough to ensure hardenability and the formation of martensite and bainite at the cooling rates available in a conventional annealing/galvanising line. Martensite is required to deliver adequate strength. Free carbon also enables stabilization of austenite which delivers improved work hardening potential and good formability for the resulting strength level. A lower limit of 0.10 mass % is needed for these reasons. A maximum level of 0.21 mass % has been found to be essential to ensure good weldability. Preferably, the amount of carbon is 0.10-0.20 mass %, more preferably 0.11-0.19 mass %, and most preferably 0.12-0.18 mass %. In this range the hardenability of the steel is optimal while the weldability of the steel is enhanced, also by the presence of boron.

Mn: 1.45-2.20 mass %. Manganese is added to increase hardenability thus making the formation of hard phases like martensite or bainite easier within the cooling rate capability of a conventional continuous annealing/galvanising line. Manganese also contributes to the solid solution strengthening which increases the tensile strength and strengthens the ferrite phase, and also helps to stabilise retained austenite. Manganese lowers the transformation temperature range of the TRIP assisted dual phase steel, thus lowering the required annealing temperature to levels that can be readily attained in a conventional continuous annealing/galvanising line. A lower limit of 1.45 mass % is needed for the above reasons. This lower limit is possible in view of the addition of other elements, such as boron. A maximum level of 2.20 mass % is imposed to ensure acceptable rolling forces in the hot mill and to ensure acceptable rolling forces in the cold mill by ensuring sufficient transformation of the intermediate hot roll product to soft transformation products (ferrite and pearlite). This maximum level is given in view of the stronger segregation during casting and the forming of a band of martensite in the strip at higher values. Preferably, the amount of manganese is 1.45-2.10 mass %, and more preferably 1.50-2.10 mass %.

Si: max 1.50 mass %. Silicon provides solid solution strengthening thus enabling the attainment of high strength, and the stabilisation of austenite via strengthening of the ferrite matrix. Silicon very effectively retards the formation of carbides during overaging, thus keeping carbon in solution for stabilisation of austenite. A maximum level of 1.50 mass % is imposed in view of the coatability of the steel strip, since high levels of silicon lead to unacceptable coating quality due to reduced adherence. Preferably, the amount of Silicon is 0.05-1.0 mass %, more preferably 0.20-0.80 mass %, and most preferably 0.30-0.70 mass %.

Al: 0.1-1.50 mass %. Aluminium is added to liquid steel for the purpose of de-oxidation. In the right quantity it also provides an acceleration of the bainite transformation, thus enabling bainite formation within the time constraints imposed by the annealing section of a conventional continuous annealing/galvanising line. Aluminium also retards the formation of carbides thus keeping carbon in solution, thus causing partitioning to austenite during overaging, and promoting the stabilisation of austenite. In addition, Al is capable of forming precipitates with nitrogen at high temperature, hence allowing vanadium to preferably form vanadium carbides which have a higher solubility. This enables choosing a wider range of coiling temperatures without vanadium precipitate formation in the hot-rolled intermediary product. The AlN precipitates/inclusions also regulate the austenite grains size distribution during slab reheating or after continuous slab casting. A maximum level of 1.50 mass % is imposed for castability, since high aluminium contents lead to poisoning of the casting mould slag and consequently an increase in mould slag viscosity, leading to incorrect heat transfer and lubrication during casting. Preferably, the amount of aluminium is 0.1-1.0 mass %, more preferably 0.2-0.9 mass %, and most preferably 0.2-0.80 mass %. A raised lower level of aluminium has the same effect as a higher amount of silicon, but hardly increases the strength of the steel and ensures a good coatability. A lower upper limit of aluminium improves the castability of the steel.

P: 0.001-0.04 mass %. Phosphorus is an element known to segregate at grain boundaries but helps to stabilize retain austenite. Its content must be limited to 0.04 mass %, so as to maintain sufficient hot ductility and to avoid failure by peel during tension-shear tests carried out on spot-welded assemblies. Preferably, the amount of Phosphorus is 0.002-0.030 mass %, more preferably 0.004-0.020 mass %.

V: 0.005-0.30 mass % and N: max 0.015 mass %. Vanadium and nitrogen are present in the amounts defined according to the invention. When the vanadium content is less than 0.005% by weight vanadium precipitation strengthening is insufficient. When the vanadium content is greater than 0.30 mass % or when the nitrogen content is greater than 0.015 mass %, the precipitation occurs at an early stage during or after the hot rolling in the form of fine precipitates, which reduces the dimensional window or coarsen during continuous annealing which reduces precipitate strengthening. The vanadium amount is 0.005-0.30 mass %, preferably 0.01-0.20 mass %, more preferably 0.03-0.20 mass %, most preferably 0.04-0.15 mass %. The content of nitrogen is limited to max. 0.015 mass % as is typical for continuous casting plants. The nitrogen amount is preferably 0.001-0.01 mass %, more preferably 0.001-0.008 mass %, most preferably 0.001-0.005 mass %.

B: 0.0005-0.005 mass %. Adding boron improves the hardenability of the steel, resulting in the possibility to use less of the other alloying elements. The boron amount is 0.0005-0.005 mass %, preferably 0.001-0.005 mass %, more preferably 0.001-0.004 mass %.

S: max 0.05 mass %. Sulphur is preferably avoided but is inevitably present in the steel making process. The lower the amount the better the formability. Sulphur in an amount of more than 0.05 mass %, precipitates excessively in the form of manganese and/or calcium sulfides that greatly reduce the formability. Preferably, the amount of sulphur is 0.0001-0.003 mass %, more preferably 0.0002-0.002 mass %.

Optionally one or more elements selected from Ti, Cr, Mo, Nb, Ni, Cu, Ca, may be added to the steel composition or be present as impurities.

Ca: max 0.004 mass %. Optionally calcium may be added. The addition of calcium modifies the morphology of manganese sulphide inclusions. When calcium is added the inclusions get a globular rather than an elongated shape. Elongated sulfur containing inclusions, also called stringers, may act as planes of weakness along which lamellar tearing and delamination fracture can occur. It is possible to add no calcium, when the Sulfur content is very low. Preferably, the amount of Ca is preferably 0-0.003 mass %, more preferably 0-0.002 mass %.

Ti: max 0.20%. Optionally Titanium may be added to strengthen the steel and to bind nitrogen. A maximum level of 0.20 mass % is imposed to limit the cost of the steel. It is possible to add no Ti. Preferably, the amount of Ti is 0.0001-0.1 mass %, more preferably 0.001-0.01 mass %, and most preferably between 0.001-0.005 mass %.

Cr: max 0.50 mass %, Mo: max 0.20 mass %. Optionally, elements such as chromium and molybdenum, which retard the bainitic transformation and promote solid-solution hardening, may be added in amounts not exceeding 0.50 and 0.20 mass % respectively. Chromium promotes formation of ferrite and is added to increase hardenability. A maximum level of 0.50 mass % is imposed to ensure that not too much martensite forms at the cost or retained austenite. It is possible to add no chromium. Preferably, the amount of Cr is 0.001-0.50 mass %, more preferably 0.001-0.35 mass %, most preferably 0.001-0.30 mass %. The amount of Mo is preferably 0.005-0.20 mass %, more preferably 0.005-0.10 mass %, so as to limit the cost of the steel and keep the dimensional window as large as possible. Mo can be added to improve to strength and improves the quality of the zinc coating. Mo also helps to strengthen the steel through precipitate formation.

Nb max. 0.10 mass %: Optionally, niobium may be added in an amount preferably 0.001-0.10 mass %, more preferably 0.001-0.08 mass %, and most preferably 0.001-0.03 mass %. The addition of Nb increases the strength by complementary carbonitride precipitation but add to hot rolling forces which reduce the dimensional window.

Ni: max. 0.20 mass %. Optionally, nickel may be added in an amount preferably 0.005-0.10 mass %, more preferably 0.005-0.050 mass %, most preferably 0.005-0.020 mass %. It is possible to add no Ni. Ni may be present as an impurity.

Cu: max. 0.20 mass %. Optionally, Copper may be added in an amount 0.005-0.10 mass %, preferably 0.005-0.050 mass %, more preferably 0.005-0.020 mass %. Cu improves the stability of retained austenite and can give precipitation strengthening. It is possible to add no Cu. Cu may be present as an impurity.

In addition the reasons given above, the ranges for carbon, manganese, silicon, aluminium, boron, vanadium, and nitrogen are chosen such that a right balance is found to deliver a transformation that is as homogeneous as possible, and during the coil cooling to ensure a steel strip that can be cold-rolled. A starting structure is obtained, enabling the rapid dissolution of carbon in the annealing line to promote hardenability and the right ferritic/bainitic transformation behaviour according to the invention. Moreover, because aluminium accelerates and boron decelerates the bainitic transformation, the right balance between aluminium and boron has to be present in order to produce the right quantity of bainite within the timescales permitted by a conventional hot dip galvanising line with a restricted overage section.

Apart from the absolute contents of the elements as given above, also the relative amounts of certain elements are of importance.

According to a preferred embodiment, the amounts of Al and Si are chosen such that the amount Al+Si is 0.70-1.60 mass %.

Aluminium and silicon together should be maintained between 0.70 and 1.60 mass % to ensure suppression of carbides in the end product and stabilisation of a sufficient amount of austenite, with the correct composition, to provide a desirable extension of formability. The amount of Al+Si is preferably 0.70-1.50 mass %, more preferably 0.80-1.40 mass %, most preferably 0.80-1.20 mass %.

Preferably the hot dip galvanised steel strip has an ultimate tensile strength Rm above 650 MPa, preferably 650-1160 MPa, more preferably 700-1150 MPa, most preferably 730-1130 MPa and/or a 0.2% proof strength Rp of 300-700 MPa after temper milling, preferably the difference between the middle and the edges of the steel strip is less than 60 MPa for Rp and/or Rm, more preferably the difference is less than 40 MPa, most preferably less than 30 MPa. These strength levels can be achieved with the composition and processing according to the present invention.

Apart from a high degree in strength over the coil width and length it is important to have a low anisotropy. Low anisotropy means that the variation in deformation characteristics, e.g. tensile strength in the directions longitudinal, diagonal and transverse to the rolling direction are below 40 MPa, preferably below 20 MPa, most preferably below 10 MPa. Hence, it is part of the invention to design a microstructure and texture that assures low anisotropy.

A subject of the invention is a steel strip of the above composition, the microstructure of which consists of ferrite, bainite, residual austenite and, optionally, martensite, and/or cementite strengthened with precipitates. In the below, the term retained austenite is also used instead of residual austenite. For the purposes of the present invention, the terms residual austenite and retained austenite have the same meaning.

According to the invention there is provided a method for producing a high strength hot dip galvanised steel strip comprising the steps of:
  a) the cast steel is hot-rolled to a thickness of 2.0-4.0 mm and coiled at a coiling temperature $C_T$, to a coiled hot-rolled steel strip,
  b) the strip is pickled
  c) the strip is then cold-rolled with a reduction of 40% or more,
  d) the strip is intercritically annealed,
  e) the strip is post-annealed in the overage section, optionally undergoes quenching and partitioning or quenching and tempering in the overage section.
  f) the strip is hot-dip galvanised,
  g) the strip is temper rolled.

Hot-dip galvanizing can be conducted through a continuous process. Optionally the steel strip can be galvannealed.

According to a preferred method for producing TRIP assisted Dual Phase steel, wherein the cold rolled material is intercritically annealed in accordance with step d) above, wherein either a heating rate of at most 40° C./s is used, and/or an intermediate soak period of 1-100 seconds is used before achieving the Ac1 temperature, resulting in a strip having more than 90% recrystallized ferrite of the ferrite fraction present in the TRIP assisted Dual Phase steel and resulting in a $n_{4-6}$ value of 0.18 or higher.

According to a preferred embodiment the steel strip has been coated in a hot-dip galvanizing process with a zinc alloy coating layer in which the coating is carried out in a bath of molten zinc alloy, wherein the zinc alloy consists of 0.3-2.3 wt %, preferably 1.6-2.3 wt % magnesium, 0.6-2.3 wt %, preferably 1.6-2.3 wt % aluminium, less than 0.0010 wt % silicon, optional less than 0.2 wt % of one or more additional elements, unavoidable impurities, the remainder being zinc.

The high strength hot-rolled strip is pickled according to known methods to give a surface finish suitable for the cold rolling. The cold rolling is carried out under standard conditions, for example by reducing the thickness of the hot-rolled strip from 2.0-4.0 mm to 0.7-2.0 mm.

According to a preferred embodiment the high strength hot dip galvanised steel strip is a complex phase steel strip.

According to a preferred embodiment the hot dip galvanised steel strip is a TRIP assisted dual phase steel strip.

According to the invention there is provided a method for producing a hot-rolled steel strip, wherein the cast steel is hot-rolled to a thickness of 2.0-4.0 mm and coiled at a coiling temperature $C_T$ between Bs+50° C. and Ms, preferably between Bs and Ms and most preferably coiled between Bs−20° C. and Ms+60° C.

A very high $C_T$ can lead to subsurface oxidation, which reduces the quality of the galvanised end coating, and reduce homogeneity.

A $C_T$ within the defined range requires less alloying elements to attain sufficient strength in the cold rolled and continuously annealed end product.

A very low $C_T$ reduces the dimensional window, because the material becomes too hard and this reduces homogeneity. In addition, at a very low $C_T$, martensite is formed and this does not give a workable strip shape.

Hence the inventors found an optimum $C_T$ range which assures good homogeneity and good strip shape of the intermediate hot-rolled product.

Due to the coiling at $C_T$ between Bs+50° C. and Ms, preferably between Bs and Ms, and most preferably coiled between Bs−20° C. and Ms+60° C., a well-defined microstructure is achieved, that can be cold-rolled with the right reduction, annealed at the suitable temperatures and galvanised afterward, to obtain a galvanised steel strip with the desired strength and properties according to the invention.

The hot-rolled strip has a microstructure consisting of 40-80 volume % ferrite, preferably 50-70 volume % ferrite, 20-50 volume % pearlite and/or bainite, preferably 30-50 volume % pearlite and/or bainite, and less than 10 volume % cementite and precipitates/inclusions. The sum should add up to 100%.

With such a microstructure the hot-rolled strip has suitable properties for further processing, especially for the annealing step, after cold-rolling. The texture of the microstructure is such that it assures a low anisotropy.

An object of the invention is to provide a method for manufacturing a high strength cold-rolled TRIP assisted dual phase steel strip, wherein the hot-rolled steel strip is cold-rolled with a reduction of 40% or more, preferably between 45 and 75%, continuously annealed at a temperature between $A_{c1}$ and $A_{c3}$ temperature, preferably between $A_{c1}$+50° C. and $A_{c3}$−30° C., overaged at a temperature below the Bs temperature, preferably overaged below Bs−50° C. to form bainite and/or tempered martensite while the retaining austenite partially enriches in carbon. Optionally the strip undergoes quenching and partitioning or quenching and tempering in the overage section.

Then the strip is coated, preferably zinc coated, according to known galvanizing methods, including hot-dip galvanising, thermal spraying and electrodeposition. Hot-dip galvanizing can be conducted through a batch process or continuous process. Optionally the steel strip can be galvannealed. The strip is then temper rolled with an elongation of less than 0.7%, preferably less than 0.5%. Preferably the strip is hot dip galvanised.

Another object of the invention is to provide a method for manufacturing a high strength cold-rolled TRIP assisted dual phase steel strip, comprising the steps of:
  a) a hot-rolled steel strip manufactured according to the invention is supplied, wherein the coiled hot-rolled strip has a microstructure consisting of 40-80 volume % ferrite, preferably 50-70 volume % ferrite, 20-50 volume % pearlite and/or bainite, preferably 30-50 volume % pearlite and/or bainite, and less than 10 volume % cementite/precipitates/inclusions, the sum should add up to 100%. The texture of the microstructure is such that it assures a low anisotropy of the end product.
  b) the strip is pickled,
  c) the strip is cold-rolled with a reduction above 40%, preferably between 45 and 75% reduction, and
  d) the strip undergoes an annealing heat treatment between transformation temperatures $A_{c1}$ and $A_{c3}$, preferably between $A_{c1}$+50° C. and $A_{c3}$−30° C., followed by one or more cooling phases at a cooling rate $V_{cs}$ when the temperature is below $A_{c3}$, followed by a overage phase at an overage temperature $T_{oa}$ for a overage time $t_{oa}$, being chosen in such a way that the microstructure of said steel consists of ferrite, bainite, residual austenite and, optionally martensite and/or cementite and inclusions/precipitates,
  e) optionally the strip undergoes quenching and partitioning or quenching and tempering in the overage section.
  f) the strip is hot-dip galvanized,
  g) the strip is temper rolled with an elongation of less than 0.7%, preferably less than 0.5%.

Optionally the strip in step f) can be galvannealed.

The high strength hot-rolled strip is pickled according to known methods to give a surface finish suitable for the cold rolling. The cold rolling is carried out under standard conditions, for example by reducing the thickness of the hot-rolled strip from 2.0-4.0 mm to 0.7-2.0 mm.

According to a preferred embodiment, the method described above for producing TRIP assisted Dual Phase steel is performed such that the cold rolled material is intercritically annealed, wherein either a heating rate of at most 40° C./s is used, preferably a heating rate of at most 20° C./s is used, and/or an intermediate soak of 1-100 seconds, preferably of 1-60 seconds, is used before achieving the Ac1 temperature, preferably in the temperature range of 350° C.-Ac1 temperature, resulting in a strip having more than 90% recrystallized ferrite of the ferrite fraction present in the TRIP assisted Dual Phase steel and resulting in a $n_{4-6}$ value of 0.18 or higher. An intermediate soak here also means a slow heating or slow cooling, or both in time mentioned.

According to a another preferred embodiment, the annealing heat treatment is chosen in such a way that the microstructure of the cold-rolled TRIP assisted dual phase steel strip consists of 20-50 volume % ferrite, preferably 25-45 volume % ferrite, 15-25 volume % retained austenite and martensite and a residual austenite contents of 5-15 volume %, preferably 5-13 volume % retained austenite, the remainder being tempered martensite, bainite, cementite and inclusions/precipitates. The total sum should add up to 100%. The microstructure is such that it leads to low anisotropy, in particular there is a low variation in the tensile properties in the longitudinal transverse and diagonal direction. The mean size of the residual austenite islands/needles does not exceed 20 microns, and preferably not exceed 10 microns and most preferably not exceed 5 microns.

The microstructure is hardened by (vanadium carbonitride) precipitates which have a size of less than 50 nm, preferably less than 30 nm, most preferably less than 20 nm.

Another object of the invention is to provide a method for the manufacture of a cold-rolled TRIP assisted dual phase steel strip according to the invention, wherein the cold-rolled strip undergoes an annealing heat treatment comprising a heating phase at a heating rate $V_{hs}$ of 10° C./s or higher, annealing between $A_{c1}$ and $A_{c3}$, preferably between $A_{c1}$+50° C. and $A_{c3}$−30° C. for a period of time between 0 and 450 s, preferably 0 and 400 s, followed by a cooling phase at a cooling rate $V_{cs}$ of greater than 5° C./s, preferably greater than 10° C./s, when the temperature is below $A_{c3}$, followed by a cooling phase to an overage temperature $T_{oa}$ below Bs, preferably below Bs−50° C., for a $t_{oa}$ of between 20 s and 500 s, preferably 30 s and 450 s. Optionally the overage includes quenching and partitioning or quenching and temper rolling. Optionally the strip is coated, preferably zinc coated as described above, optionally annealed followed by a temper mill elongation of less than 0.7%, preferably less than 0.5%. Optionally the strip is galvannealed. Preferably the strip is hot dip galvanised.

According to a further aspect of the invention there is provided a method for producing a high strength hot dip galvanised complex phase steel strip according to the first aspect of the invention, wherein the cast steel is hot-rolled to a thickness of 2.0-4.0 mm and coiled at a coiling temperature $C_T$ between Bs and Ms temperature, preferably between Bs−20° C. temperature and Ms+60° C. temperature. The coiling temperature in the hot-rolling is chosen below the Bs temperature and preferably below Bs−20° C., in order to keep more vanadium available in solid solution for precipitation during the subsequent annealing after cold-rolling.

Due to the coiling at $C_T$ between Bs and Ms, preferably between Bs and Ms, preferably coiled between Bs−20° C. and Ms+60° C., a well-defined microstructure is achieved, that can be cold-rolled with the right reduction, annealed and galvanised, to obtain a galvanised steel strip with the desired strength and properties according to the invention.

With such a microstructure the hot-rolled strip has suitable properties for further processing, especially for the annealing step, after cold-rolling.

According to a preferred embodiment the strip is cold-rolled with a reduction of 40% or more, preferably between 45 and 75%.

An annealing treatment is then carried out suitable for recrystallizing the work-hardened structure and for giving the particular microstructure according to the invention. This treatment, is preferably carried out by continuous annealing, comprising a heating phase, soaking phase and overaging.

According to a preferred embodiment the annealing heat treatment is chosen in such a way that the microstructure of the cold rolled complex phase steel strip consists of 20-50 volume % ferrite, preferably 25-45 volume % ferrite, 15-25 volume % retained austenite and martensite, and a residual austenite content of 5-15 volume % retained austenite, preferably 5-13 volume % retained austenite, more preferably 3-13 volume % retained austenite, and most preferably 3-12 volume % retained austenite, the remainder being tempered martensite, bainite, cementite and precipitates/inclusions. The sum should add up to 100%.

The inventors observed during the heating phase: recrystallization of the work-hardened structure; dissolution of the cementite; growth of the austenite above the transformation temperature $A_{c1}$; and precipitation of said vanadium carbonitrides in the ferrite. These carbonitride precipitates are very small, typically having a diameter of less than 50 nanometres, preferably less than 30 nm after this heating phase.

Another object of the invention is to provide a method for manufacturing a high strength cold-rolled complex phase steel strip, comprising the steps of:
a) a hot-rolled steel strip manufactured according to the invention is supplied, wherein the coiled hot-rolled strip has a microstructure consisting of 40-80 volume % ferrite, preferably 50-70 volume % ferrite, 20-50 volume % pearlite and/or bainite, preferably 30-50 volume % pearlite and/or bainite, and less than 10 volume % cementite/precipitates/inclusions, the sum should add up to 100%,
b) the strip is pickled,
c) the strip is cold-rolled with a reduction above 40% reduction, preferably between 45 and 75% reduction, and
d) the strip undergoes an annealing heat treatment above $A_{c1}$+50° C. followed by one or more cooling phases at a cooling rate $V_{cs}$ when the temperature is below $A_{c3}$, followed by a cooling phase at an overage temperature $T_{oa}$ for a overage time $t_{oa}$, being chosen in such a way that the microstructure of said steel consists of ferrite, bainite, residual austenite and, optionally martensite and/or cementite, precipitates and inclusions,
e) optionally the strip undergoes quenching and partitioning or quenching and tempering in the overage section.
f) the strip is zinc coated, preferably hot-dip galvanized,
g) the strip is temper rolled with a reduction of 0.4-2.0%, preferably with a reduction of 0.4-1.2%.

Optionally the strip in step f) is galvannealed.

The texture of the microstructure in step a) is such that it assures a low anisotropy of the end product.

In a preferred embodiment the cold-rolled complex phase steel strip undergoes an annealing heat treatment comprising a heating phase at a heating rate $V_{hs}$ of 10° C./s or higher, annealing above $A_{c1}$+50° C., preferably above $A_{c1}$+80° C. for a period of time between 0 and 450 s, preferably 0 and 400 s, followed by a cooling phase at a cooling rate $V_{cs}$ of greater than 5° C./s, preferably greater than 10° C./s, when the temperature is below $A_{c3}$, followed by a cooling phase to an overage temperature $T_{oa}$ below Bs−50° C., preferably below Bs−100° C. for a $t_{oa}$ of between 20 s and 500 s, preferably 30 s and 450 s. Optionally the strip undergoes quenching and partitioning or quenching and tempering. Optionally, after the overaging phase, the strip is coated, preferably zinc coated, according to the known galvanizing methods, including hot-dip galvanised, thermal spraying and electrodeposition. Hot-dip galvanizing can be conducted through a batch process or continuous process. Optionally the steel strip can be galvannealed. Preferably the strip is hot dip galvanised.

The high strength hot dip galvanised complex phase steel strip according to the invention is then tension rolled with a reduction of 0.4-2.0%, preferably with a reduction of 0.4-1.2%. This percentage of tension rolling can provide the right mechanical properties to the strip, such as the right yield and tensile strength levels, while the other properties remain inside the desired window for complex phase material. The resulted complex phase steel strip can be made due to the selected $C_T$, the prescribed annealing, overaging temperatures and temper mill elongation range.

The steel strip types according to the invention are used preferably for the manufacture of structural component or reinforcing elements in the automotive industry.

The invention will be elucidated hereafter. The following results show, by way of non-limiting examples, the advantageous characteristics conferred by the invention.

$A_1$—Temperature above which the microstructure is composed of a mixture of ferrite (alpha-Fe) and austenite; The $A_{c1}$ temperature was calculated according to the formula described by S. H. Park et al, in Development of Ductile Ultra-High Strength Hot-rolled Steels, Posco Technical Report, 1996, 50-128.

$A_3$—Temperature above which the microstructure is entirely composed of austenite. The $A_{c3}$ temperature was calculated according to the formula described by KARIYA, N. High Carbon Hot-Rolled Steel Sheet and Method for Production Thereof. European patent Application EP 2.103.697.A1, 23 Sep. 2009, 15 p.

The suffixes c and r in $A_1$ and $A_3$ denote transformations in the heating and cooling cycle respectively.

n-value: The work hardening coefficient or n-value is closely related to uniform elongation. In most sheet forming processes the limit of formability is determined by the resistance to local thinning or "necking". In uniaxial tensile testing necking commences at the extent of uniform elongation, n-value and uniform elongation derived from the tensile test can be taken as a measure of the formability of sheet steels. When aiming to improve formability of strip steels n-value and uniform elongation represent the most suitable optimisation parameters.

$n_{4\_6}$—value is the specific hardenability value between 4 and 6% elongation.

Rm (MPa): Tensile strength—Stress corresponding to the maximum strength.

Rp (MPa): Yield strength—Stress at which a non-proportional extension is equal to a specified percentage of the extensometer gauge length (Le). The symbol used is followed by the suffix giving the prescribed percentage, such as Rp0,2

Ag (%): Uniform elongation—Percentage non-proportional elongation at maximum strength.

A80(%): Total elongation till rupture.

The hole expansion an indicator to evaluate stretch flanging performance of steel sheets, which is usually obtained by hole expanding test using cylindrical or conical punch and it was measure according to M. W. BOYLES, Operating Procedure CP/04/OP/04 Procedure for Hole Expansion Testing, British Steel Strip Products (1997).

Bs is the bainite start temperature and Ms the martensite start temperature. Bs and Ms were calculated according to S. M. C. van Bohemen, Bainite and martensite Start Temperature calculated with exponential carbon dependence, Materials Science and Technology 28, 4 (2012) 487-495.

FIG. 1: Yield and tensile strength tensile values of composition L1 at head, middle and tail along the length of the coil. The horizontal axis represents the width: left edge, middle and right edge of the coil section.

Figure 2:
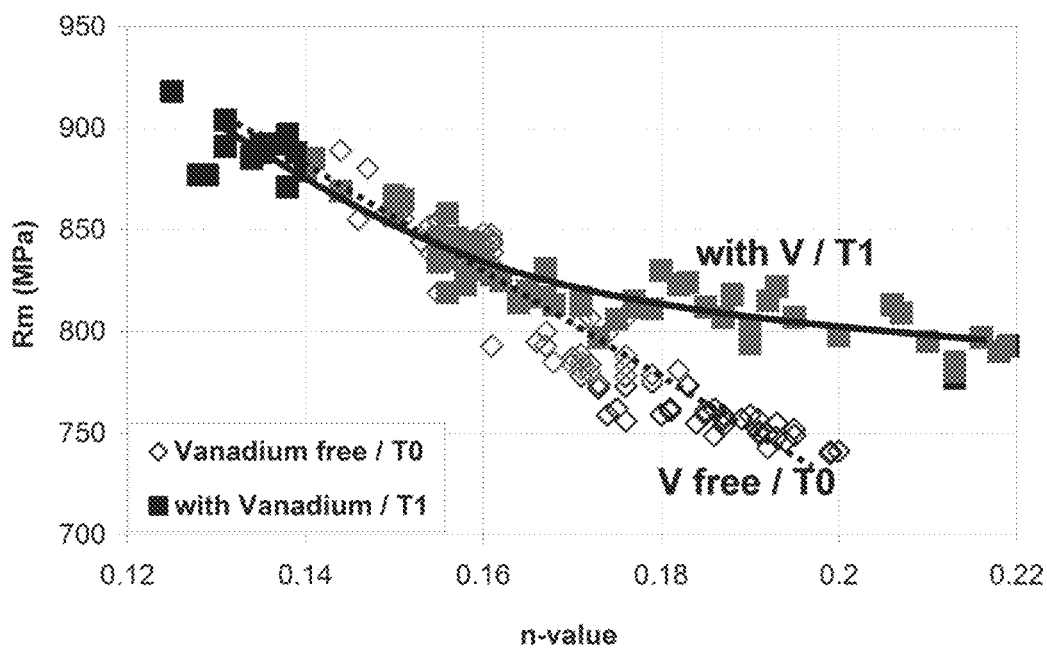

FIG. 2—top: hardenability coefficient (n-value) versus tensile strength (Rm) for a series of continuously annealed alloy without vanadium (T0) and with vanadium (T1). The material was not temper rolled after annealing.

Figure 3:
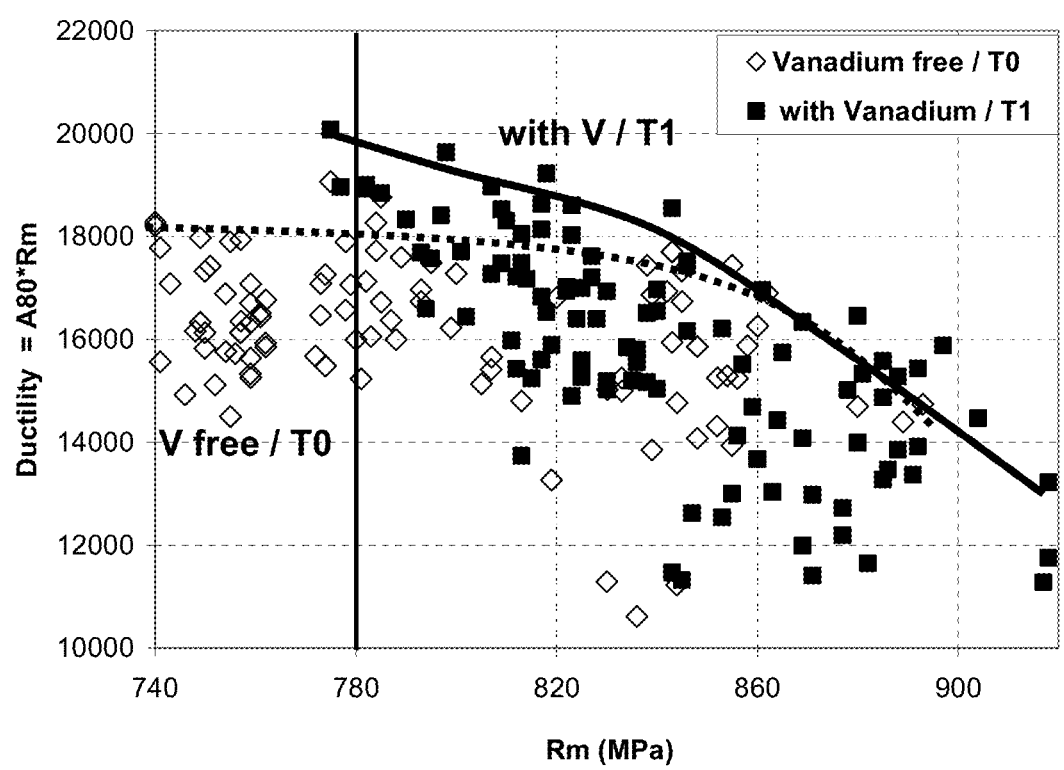

FIG. 3—bottom: Tensile strength (Rm) versus Ductility (total elongation (A80) times tensile strength (Rm)) for a series of continuously annealed alloy without vanadium (T0) and with vanadium (T1). The material was not temper rolled after annealing.

Figure 4:
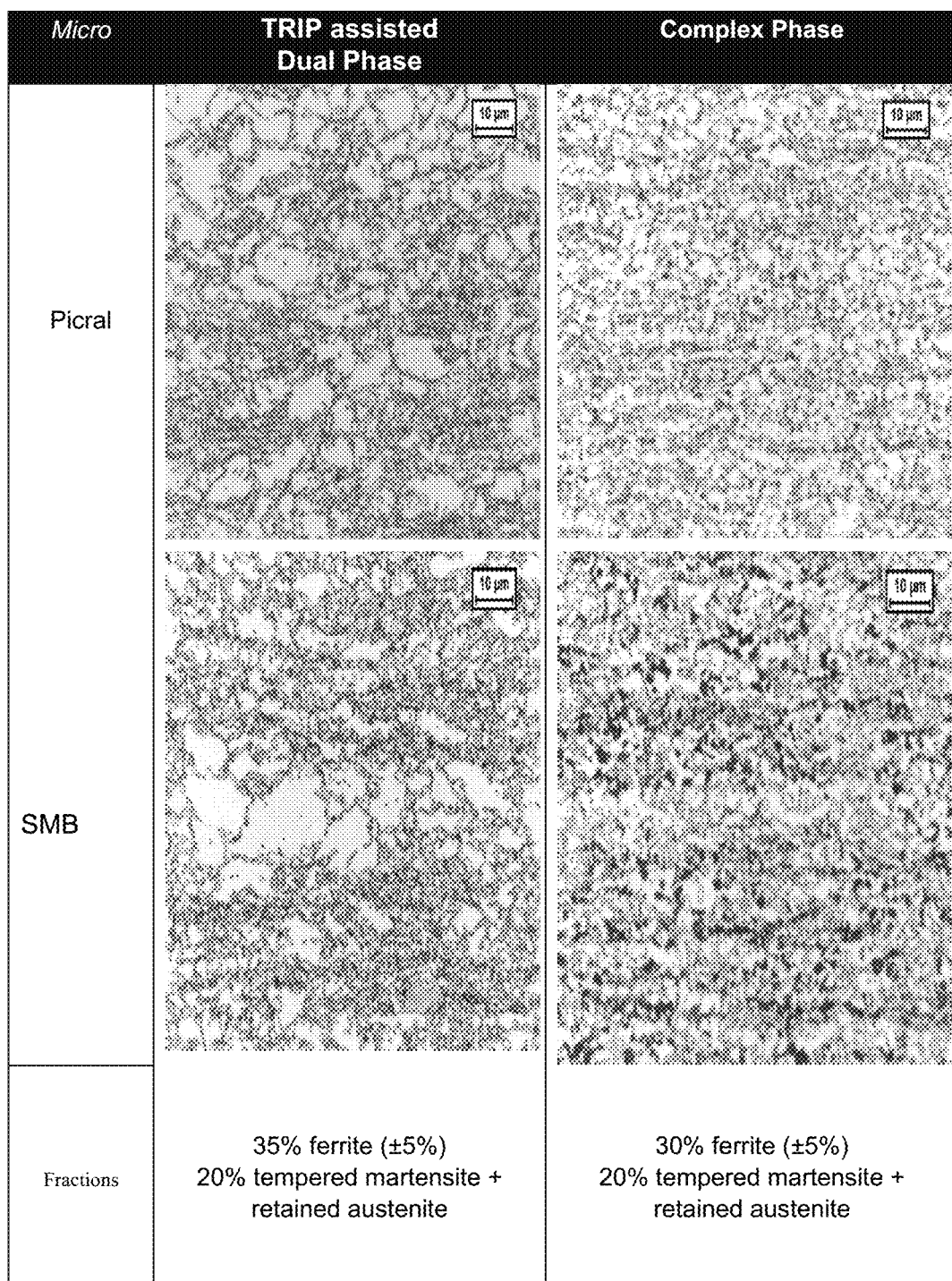

FIG. 4: Microstructure images of the TRIP assisted Dual Phase and Complex Phase cold-rolled end product at a quarter gauge.

EXAMPLE 1

Steel composition L2 was cast and hot-rolled to a finishing temperature of approximately 930° C., above the $A_{c3}$ temperature of approximately 920° C. and was cooled with a cooling rate of approximately 100° C./s to a coiling temperature of approximately 510° C. The material was subsequently cooled to room temperature with a cooling rate of 1° C./min. The end gauge was 3.7 mm. The material was cold-rolled to 1.2 mm, then continuously annealed at a top temperature of approximately 840° C., cooled to approximately 400° C. and held at this temperature for 60 seconds, then heated to approximately 470° C. for galvanization and finally cooled to room temperature. The measured tensile properties are described in Table 3.

EXAMPLE 2

Several coils of the T1 steel composition having 1.3 mm gauge were manufactured under the same conditions as in example 1. In addition, a temper mill elongation 0.4% was applied. The homogeneity test was performed on the zinc coated strip end product of said coils. The tensile properties Rp and Rm were measured at the coil midwidth and edge positions at the beginning, middle and end of the coil. The experimental results represented in FIG. 1 showing yield and tensile strength values in head, middle and tail at mid-width and edge of the coil and these vary at maximum 30 MPa.

EXAMPLE 3

From steel composition T1 Complex Phase steel strip was produced by hot rolling as in example 1, cold rolled to 1.3 mm and annealed at approximately 840° C. for at least 40 seconds according to the description. After hot dip galvanising, the strip was temper rolled with a reduction of approximately 0.9%. The resulting steel strip is a complex phase steel with an increased Rp compared to the examples of Table 3.

EXAMPLE 4

Steel composition T0 without vanadium and T1 containing vanadium were manufactured. 1.3 mm gauge cold rolled steel composition T0 and T1 were continuously annealed. The annealing soak temperature ranged between 770 and 880° C. Subsequently the samples were overaged between 390 and 470° C., zinc coated at 460° C. for a few seconds and cooled to room temperature. Tensile tests were made of each annealing conditions.

During the development of the high strength hot dip galvanizing steel strips according to the invention, a number of strip coils have been produced as indicated in Table 1. T0-T4 are line trial compositions and temper rolled, and L1-L4 are lab cast alloy compositions without being temper rolled according to the invention.

TABLE 1

Steel compositions in milli-wt % and B, N, Ca and S in wt-ppm.

| Cast | C | Mn | Si | Al | V | P | Cr | Ti | Mo | Cu | Ni | Nb | B | N | Ca | S |
|---|---|---|---|---|---|---|---|---|---|---|---|---|---|---|---|---|
| | | | | | | mwt % | | | | | | | | wt-ppm | | |
| T0 | 149 | 2057 | 392 | 602 | 4 | 10 | 28 | 6 | 8 | 20 | 19 | ND | 24 | 30 | 14 | <10 |
| T1 | 150 | 2031 | 406 | 589 | 60 | 9 | 25 | 6 | 7 | 20 | 18 | 1 | 25 | 28 | 16 | <10Top of Form |

TABLE 1-continued

Steel compositions in milli-wt % and B, N, Ca and S in wt-ppm.

| Cast | C | Mn | Si | Al | V | P | Cr | Ti | Mo | Cu | Ni | Nb | B | N | Ca | S |
|---|---|---|---|---|---|---|---|---|---|---|---|---|---|---|---|---|
| | | | | | mwt % | | | | | | | | | | wt-ppm | |
| T2 | 147 | 2028 | 402 | 584 | 62 | 10 | 22 | 6 | 6 | 21 | 12 | 1 | 21 | 29 | 14 | <10 |
| T3 | 155 | 2040 | 406 | 600 | 64 | 10 | 22 | 5 | 5 | 20 | 12 | ND | 19 | 28 | 14 | <10 |
| T4 | 149 | 2062 | 408 | 602 | 60 | 9 | 16 | 11 | 5 | 18 | 18 | 6 | 21 | 40 | 15 | <10 |
| T5 | 145 | 2000 | 455 | 519 | 61 | 13 | 23 | 7 | 4 | 15 | 15 | ND | 20 | 21 | 6 | 10 |
| L1 | 148 | 1702 | 422 | 609 | 62 | 12 | 1 | 2 | 3 | ND | ND | ND | 23 | 27 | ND | 23 |
| L2 | 147 | 2020 | 425 | 619 | 62 | 12 | 1 | 2 | 3 | ND | ND | ND | 22 | 28 | ND | 22 |
| L3 | 150 | 1513 | 610 | 405 | 119 | 11 | 1 | 1 | 3 | ND | ND | ND | 22 | 29 | ND | 30 |
| L4 | 165 | 2031 | 616 | 409 | 120 | 11 | 1 | 2 | 3 | ND | ND | ND | 22 | 32 | ND | 30 |
| L5 | 184 | 2073 | 622 | 450 | 61 | 13 | 1 | 1 | 4 | ND | ND | ND | 22 | 39 | ND | 1 |
| L6 | 184 | 2050 | 614 | 438 | 120 | 12 | 1 | 1 | 3 | ND | ND | ND | 20 | 34 | ND | 9 |
| L7 | 173 | 2071 | 612 | 441 | 115 | 14 | 1 | 1 | 3 | ND | ND | 1 | 24 | 43 | ND | 2 |
| L8 | 198 | 2064 | 615 | 429 | 115 | 15 | 1 | 1 | 3 | ND | ND | 1 | 24 | 38 | ND | 3 |
| L9 | 180 | 2054 | 605 | 427 | 172 | 12 | 1 | 1 | 4 | ND | ND | 1 | 23 | 42 | ND | 9 |
| L10 | 183 | 2051 | 1008 | 440 | 172 | 13 | 1 | 1 | 3 | ND | ND | 1 | 24 | 40 | ND | 11 |
| L11 | 185 | 2043 | 607 | 406 | 118 | 12 | 1 | 1 | 102 | ND | ND | 1 | 21 | 30 | ND | 5 |
| L12 | 185 | 2039 | 608 | 414 | 118 | 13 | 1 | 110 | 3 | ND | ND | 1 | 23.5 | 33 | ND | 2 |
| L13 | 185 | 2040 | 400 | 410 | 130 | 10 | 310 | ND | ND | 8 | ND | ND | 20 | 50 | ND | 12 |
| L14 | 180 | 2050 | 390 | 410 | 100 | 10 | ND | ND | ND | 8 | ND | ND | 20 | 60 | ND | 10 |

ND: Not Detected

Table 2 indicates the Al+Si sum, the calculated Bainite start (Bs) and martensite start (Ms) temperatures, and the calculated phase transition temperatures $A_{c1}$ and $A_{c3}$ of the cast compositions.

TABLE 2

| Cast | Al + Si milli-wt % | Bs T/° C. | Ms T/° C. | Ac1 T/° C. | Ac3 T/° C. |
|---|---|---|---|---|---|
| T0 | 994 | 601 | 416 | 723 | 912 |
| T1 | 995 | 603 | 416 | 725 | 912 |
| T2 | 986 | 605 | 418 | 725 | 913 |
| T3 | 1006 | 602 | 413 | 724 | 911 |
| T4 | 1074 | 600 | 411 | 726 | 914 |
| L1 | 1031 | 634 | 427 | 731 | 924 |
| L2 | 1044 | 607 | 418 | 725 | 917 |
| L3 | 1015 | 646 | 430 | 739 | 924 |
| L4 | 1025 | 597 | 406 | 730 | 906 |
| L5 | 1072 | 587 | 396 | 728 | 901 |
| L6 | 1052 | 590 | 396 | 729 | 901 |
| L7 | 1053 | 591 | 401 | 729 | 904 |
| L8 | 1044 | 585 | 389 | 728 | 895 |
| L9 | 1032 | 591 | 398 | 729 | 901 |
| L10 | 1448 | 581 | 392 | 739 | 921 |
| L11 | 1013 | 583 | 397 | 729 | 905 |
| L12 | 1022 | 590 | 396 | 729 | 910 |
| L13 | 810 | 575 | 396 | 729 | 884 |
| L14 | 800 | 596 | 401 | 723 | 888 |

Table 3 shows the yield strength ($Rp_{0.2}$), tensile strength (Rm), uniform elongation (Ag), total elongation (A80) and the work hardening coefficient (n) or n-value at mid coil. Hole expansion was determined for T0 and T1.

TABLE 3

| Cast | $Rp_{0.2}$ (MPa) | Rm (MPa) | Ag (%) | A80/JIS (%) | n-value | Hole expansion (%) | |
|---|---|---|---|---|---|---|---|
| T0 | 435 | 760 | 16.4 | 24.2 (A80) | 0.16 | 22-26 | Comparative example |
| T1 | 485 | 801 | 14.6 | 21.8 (A80) | 0.15 | 22-26 | Invention |
| T2 | 482 | 805 | 14.6 | 21.3 (A80) | 0.14 | | Invention |
| T3 | 490 | 809 | 14.5 | 22.0 (A80) | 0.14 | | Invention |
| T4 | 489 | 798 | 14.4 | 23.5 (A80) | 0.15 | 32 | Invention |
| L1 | 358 | 731 | 16.7 | 20.2 (A80) | 0.20 | | Invention |
| L2 | 408 | 862 | 14.0 | 18.2 (A80) | 0.15 | | Invention |
| L3 | 385 | 738 | 18.3 | 22.1 (A80) | 0.21 | | Invention |
| L4 | 506 | 1010 | 10.6 | 13.6 (A80) | 0.12 | | Invention |
| L5 | 404 | 895 | 15.1 | 20.3 (JIS) | 0.17 | | Invention |
| L6 | 444 | 981 | 12.4 | 17.4 (JIS) | 0.15 | | Invention |
| L9 | 480 | 1012 | 12.3 | 16.5 (JIS) | 0.14 | | Invention |
| L10 | 542 | 1104 | 10.4 | 14.8 (JIS) | <0.10 | | Invention |
| L11 | 531 | 1091 | 10.4 | 13.4 (JIS) | 0.11 | | Invention |
| L12 | 414 | 970 | 14.2 | 18.8 (JIS) | 0.16 | | Invention |
| L13 | 515 | 1071 | 10.7 | 14.1 (A80) | 0.11 | | Invention |
| L14 | 420 | 950 | 12.3 | 13.6 (A80) | 0.15 | | Invention |

In Table 3 all steel strips show a high strength Rm of above 730 MPa. The comparison of T0 with T1 to T3 clearly shows a substantial difference in Rm, wherein a higher strength steel strip of around 800 MPa is obtained, if vanadium is present. It is therefore obvious that the vanadium addition increases strength. This is also supported by the fact that although the hole expansion in T0 and T1 is similar, the tensile strength Rm of T1 is by 40 MPa higher compared to T0.

Table 3 further shows that due to the higher vanadium amount in L4, a high tensile strength above 1000 MPa can be obtained. Although in L1 and L3 the strength Rm is similar, L3 having higher vanadium content, shows better n-value and elongation (A80). It is further clear from table 3 that the variation of the amounts of the other alloys with vanadium results in high strength steel strips with improved elongation and n-values.

T1 alloy was hot rolled, cold rolled and continuous annealed using a complex phase annealing cycle according to the invention and subsequently temper rolled with 0.9%. The results are shown in table 4. Table 4 clearly shows that a high strength steel having complex phase steel properties can be obtained. High Rp and Rm between 780-920 MPa are typical values for complex phase high strength steel.

TABLE 4

Tensile properties at mid coil for material T1. Yield strength was measured after 0.9% temper mill elongation. Tensile properties for L5-L14 (not temper rolled).

| Cast | Rp (MPa) | Rm (MPa) | Ag (%) | A80/JIS (%) | n-value |
|---|---|---|---|---|---|
| T1 | 620 | 872 | 11.5 | 17.6 (A80) | 0.11 |
| T1 | 600 | 910 | 10.8 | 18.3 (A80) | 0.10 |
| L5 | 493 | 1004 | 13.0 | 17.6 (JIS) | 0.14 |
| L6 | 556 | 1091 | 10.8 | 15.1 (JIS) | 0.12 |
| L7 | 553 | 1108 | 10.3 | 14.2 (JIS) | <0.10 |
| L9 | 577 | 1129 | 9.8 | 13.1 (JIS) | <0.10 |
| L11 | 613 | 1150 | 9.0 | 12.7 (JIS) | <0.10 |
| L12 | 447 | 994 | 13.7 | 18.6 (JIS) | 0.15 |
| L13 | 589 | 1146 | 8.8 | 11.7 (A80) | <0.10 |
| L14 | 507 | 1040 | 11.3 | 15.9 (A80) | 0.12 |

FIG. 2 shows a plot with tensile strength values versus n-value from the tensile test and FIG. 3 shows the calculated ductility versus tensile strength. For TRIP assisted Dual Phase materials it is of importance to maximise the hardening coefficient n and ductility (A80*RM) whereas at the same time maximise the tensile strength Rm so that stretch forming and deep drawing properties are optimum while high strength is obtained.

In FIGS. 2 and 3 the white diamond symbols and dotted line represent the data of the example T0 without vanadium. The solid line and black and grey square symbols show the example T1 with vanadium.

FIGS. 2 and 3 clearly show that the steel composition with vanadium retains its strength in the 800 MPa range while allowing a significant improvement in hardening coefficient (FIG. 2) and ductility (FIG. 3) at the 800 MPa strength level. This leads to improved formability, in particular improved stretch forming and deep drawing.

FIG. 4 are microstructure images at a quarter thickness of a complex phase steel strip and a TRIP assisted dual phase steel strip based on composition T1 and manufactured according to the method described above.

The optical microscope images are obtained after Picral and SMB etching. In the Picral graphs the dark areas represent bainite, martensite or tempered martensite. In the Nital graph the off-white areas indicate ferrite. In the SMB etching the dark grey areas represent martensite formation and the light areas ferrite.

In the TRIP assisted Dual Phase microstructure on the left-hand side in FIG. 4 there are off-white areas where the sizes can exceed 10 μm. These areas denote the presence of ferrite and the large size of the ferrite give the material its characteristic low yield stress. The retained austenite contents were measured with X-ray diffraction and amount to around 10%. This gives the dual phase material its TRIP assisted character.

The differences between TRIP assisted Dual Phase strip on the left-hand side and Complex Phase strip on the right-hand side are clearly visible. The white coloured areas of the Complex Phase strip are finer and there are more brown coloured areas in the SMB etching which refers to the formation of (tempered) martensite.

The complex phase microstructure is featured with finer light off-white areas, showing that ferrite grains are finer. There are more dark grey areas in the SMB etching and these are typical for the presence of lower carbon (tempered) martensite and/or bainite. The combination of these phenomena lead to a higher Rp and obvious the retained austenite contents are lower. This is typical for a complex phase type of steel.

TABLE 5

Tensile test parameters of a tensile test performed in the directions 0°, 45° and 90° to the rolling direction.

| angle with rolling direction | $R_P$ | $R_M$ | $A_g$ | A80 | n | $n_{4\_6}$ | r |
|---|---|---|---|---|---|---|---|
| 90° | 519 | 817 | 13 | 18 | 0.14 | 0.18 | 0.9 |
| 0° | 506 | 817 | 14 | 21 | 0.15 | 0.19 | 0.7 |
| 45° | 514 | 811 | 14 | 20 | 0.15 | 0.18 | 0.9 |

Minimum anisotropy of the TRIP assisted Dual Phase steel strip T1 was measured by performing tensile tests in the directions 0°, 45° and 90° compared to the rolling direction. Table 5 shows that there is a minimum difference in Rp and Rm and Ag, n-value and Lankford coefficient or r-value in these 3 directions. A minimum difference in tensile values over the three directions indicates that the material is uniformly deformable independently of the rolling direction. A minimum anisotropy is of advantage for homogeneous stretching or deep drawing deformation. N4_6 values are 0.18 or exceed these values and it was seen that this is related to a low heating rate or soak before austenite formation, allowing more than 90% of (precipitate containing) ferrite to recrystallize before austenite starts to form. This soak can be a hold temperature time at a temperature below the Ac1 temperature for 1-100 seconds. Optionally, the soak consists of a heating or a cooling traject or any combination of the soak options. Irrespective of the heating with soak, it is done in such a way that the heated strip is hold for 1-100 s in a temperature regime below Ac1 temperature, for example between 350° C. and $A_{c1}$ temperature.

The invention claimed is:

1. A high strength hot dip galvanised steel strip consisting, in mass percent, of the following elements:
   0.10-0.21% C
   1.50-2.10% Mn
   0.2-1.50% Si
   0.1-1.50% Al
   0.001-0.04% P
   0.001-0.005% B
   0.05-0.30% V max. 0.015% N max. 0.05% S and, optionally, one or more elements selected from:
- max. 0.004% Ca
- max. 0.10% Nb
- max. 0.50% Cr
- max. 0.20% Mo
- max. 0.20%, Ni
- max. 0.20% Cu
- max. 0.20% Ti wherein the amount of Al+Si is 0.70-1.60 mass %, the balance of the composition consisting of Fe and inevitable impurities, wherein the strip has undergone a cold rolling reduction of 40% or more starting from a hot rolled thickness of 2.0-4.0 mm, and wherein vanadium precipitates are present in the hot rolled strip after annealing of the strip; and wherein the strip has an ultimate tensile strength Rm above 650 MPA and 0.2% roof strength Rp of 300-700 MPa after temper rolling which occurred after the annealing.

2. The steel strip according to claim 1, wherein the amount of Al+Si is 0.70-1.50 mass %.

3. The steel strip according to claim 1, wherein the amount of V is 0.06-0.20 mass %.

4. The steel strip according to claim 3, wherein the amount of B is 0.0019-0.005 mass.

5. The steel strip according to claim 4, wherein the amount of C is 0.10-0.20 mass %, wherein the amount of Si is 0.2-1.0 mass %.

6. The steel strip according to claim 5, wherein the amount of Al is 0.1-1.0 mass %.

7. The steel strip according to claim 1, wherein the steel strip has a microstructure consisting of
- 20-50 volume % ferrite,
- 15-25 volume % retained austenite and martensite and
- 5-15 volume % retained austenite,
- the remainder being tempered martensite, bainite, cementite, and precipitates/inclusions, the sum adds up to 100%.

8. The steel strip according to claim 1, wherein the hot dip galvanised steel strip has an ultimate tensile strength Rm of 700-1150 MPa after temper rolling.

9. The steel strip according to claim 1, wherein the steel strip is a TRIP assisted dual phase or a complex phase steel strip.

10. The steel strip according to claim 1, wherein the amount of Al+Si is 0.80-1.40 mass %.

11. The steel strip according to claim 1, the amount of C is 0.11-0.19 mass %.

12. The steel strip according to claim 1, wherein the amount of Si is 0.2-0.8 mass %.

13. The steel strip according to claim 1, wherein the amount of B amount is 0.001-0.004 mass %.

14. The steel strip according to claim 1, wherein the amount of V is 0.05-0.20 mass Vo.

15. The steel strip according to claim 1, wherein the amount of Al is 0.2-0.9 mass %.

16. A steel strip produced according to claim 1, wherein the steel strip is a TRIP assisted dual phase or a complex phase steel strip.

17. The steel strip according to claim 1, wherein the amount of Al+Si is 0.80-1.20 mass %.

18. The steel strip according to claim 1, the amount of C is 0.12-0.18 mass %, wherein the amount of Si is 0.30-0.70 mass %, wherein the amount of Al is 0.2-0.8 mass %.

19. The method for producing a high strength hot dip galvanised steel strip according to claim 1, comprising the steps of:
- a) the cast steel is hot-rolled to a thickness of 2.0-4.0 mm and coiled at a coiling temperature $C_T$, wherein the coiled hot-rolled steel strip has a microstructure consisting of 40-80 volume % ferrite, 20-50 volume % pearlite and/or bainite, and less than 10 volume % cementite/precipitates/inclusions, wherein the sum adds up to 100%,
- b) the strip is pickled,
- c) the strip is then cold-rolled with a reduction of 40% or more,
- d) the strip is intercritically annealed,
- e) the strip is post-annealed in the overage section, optionally undergoes quenching and partitioning or quenching and tempering,
- f) the strip is hot-dip galvanised,
- g) the strip is temper rolled.

20. The method according to claim 19,
wherein the cast steel undergoes said hot rolling to the thickness of 2.0-4.0 mm and is coiled at the coiling temperature $C_T$ between Bs+50° C. and Ms temperature, resulting in an intermediate hot-rolled steel strip having the microstructure consisting of 40-80 volume % ferrite, 20-50 volume % pearlite and/or bainite, and less than 10 volume % cementite/precipitates/inclusions, wherein the sum adds up to 100%.

21. The method according to claim 19, wherein the steel strip is TRIP assisted Dual Phase steel strip, wherein the cold rolled material is intercritically annealed, wherein either a heating rate of at most 40° C./s is used, and/or an intermediate soak of 1-100 seconds is used before achieving Ac1 temperature, resulting in a strip having more than 90% recrystallized ferrite of the ferrite fraction present in the TRIP assisted Dual Phase steel and resulting in a $n_{4-6}$ value of 0.18 or higher, wherein $n_{4-6}$ is the specific hardenability value between 4 and 6% elongation.

22. The method according to claim 19, wherein the steel strip is high strength cold rolled TRIP assisted dual phase steel strip, comprising the steps of:
- a) the cast steel undergoes said hot-rolling to the thickness of 2.0-4.0 mm and coiled at the coiling temperature $C_T$, wherein the coiled hot-rolled steel strip has the microstructure consisting of 40-80 volume % ferrite, 20-50 volume % pearlite and/or bainite, and less than 10 volume % cementite/precipitates/inclusions, the sum adds up to 100%,
- b) the strip undergoes said pickling,
- c) the strip then undergoes said cold-rolling with a reduction of 40% or more,
- d) the strip undergoes the annealing heat treatment between transformation temperatures $A_{c1}$ and $A_{c3}$, followed by one or more cooling phases at a cooling rate $V_{cs}$ when the temperature is below $A_{c3}$, followed by a overage phase at an overage temperature $T_{oa}$ for a overage time $t_{oa}$, being chosen in such a way that the microstructure of said steel consists of ferrite, bainite, residual austenite and, optionally martensite and/or cementite,
- e) optionally the annealed strip undergoes the quenching and partitioning or quenching and tempering in the overage section,
- f) the strip undergoes said hot-dip galvanizing,
- g) the strip undergoes said temper rolling with an elongation of less than 0.7%, preferably less than 0.5%.

23. The method according to claim 19, wherein the steel strip is a high strength cold rolled complex phase steel strip, comprising the steps of:
  a) the cast steel undergoes said hot-rolling to the thickness of 2.0-4.0 mm and coiled at the coiling temperature $C_T$, wherein the coiled hot-rolled steel strip has the microstructure consisting of 40-80 volume % ferrite, 20-50 volume % pearlite and/or bainite, and less than 10 volume % cementite/precipitates/inclusions, the sum adds up to 100%,
  b) the strip undergoes said pickling,
  c) the strip undergoes said cold-rolling with a reduction above 40% reduction,
  d) the strip undergoes the annealing heat treatment above $A_{c1}+50°$ C., followed by one or more cooling phases at a cooling rate $V_{cs}$ when the temperature is below $A_{c3}$, followed by a cooling phase at an overage temperature $T_{oa}$ for a overage time $t_{oa}$, being chosen in such a way that the microstructure of said steel consists of ferrite, bainite, residual austenite and, optionally martensite and/or cementite,
  e) optionally the annealed strip undergoes quenching and partitioning or quenching and tempering in the overage section,
  f) the strip undergoes said hot-dip galvanizing,
  g) the strip undergoes said temper rolling with a reduction of 0.4-2.0%.

24. The method according to claim 20, wherein the steel strip is TRIP assisted Dual Phase steel strip, wherein the cold rolled material is intercritically annealed, wherein either a heating rate of at most 40° C./s is used, and/or an intermediate soak of 1-100 seconds is used before achieving Ac1 temperature, resulting in a strip having more than 90% recrystallized ferrite of the ferrite fraction present in the TRIP assisted Dual Phase steel and resulting in a $n_{4-6}$ value of 0.18 or higher, wherein $n_{4-6}$ is the specific hardenability value between 4 and 6% elongation.

25. A high strength hot dip galvanised steel strip consisting, in mass percent, of the following elements:
  0.10-0.21% C
  1.45-2.20% Mn
  max 1.50% Si
  0.1-1.50% Al
  0.001-0.04% P
  0.0005-0.005% B
  0.005-0.30% V
  max. 0.015% N
  max. 0.05% S
  and, optionally, one or more elements selected from:
    max. 0.004% Ca
    max. 0.10% Nb
    max. 0.50% Cr
    max. 0.20% Mo
    max. 0.20%, Ni
    max. 0.20% Cu
    max. 0.20% Ti,
  wherein the amount of Al+Si is 0.70-1.60 mass %,
  the balance of the composition consisting of Fe and inevitable impurities, wherein the hot dip galvanised steel strip has an ultimate tensile strength Rm of at least 650 MPa and/or a 0.2% proof strength Rp of 300-700 MPa after temper rolling and wherein the difference between the middle and the edges of the steel strip is less than 60 MPa for Rp and/or Rm.

26. The steel strip according to claim 25, wherein the difference between the middle and the edges of the hot dip galvanised steel strip is less than 40 MPa for Rp and/or Rm.

27. The steel strip according to claim 25, wherein the difference between the middle and the edges of the hot dip galvanised steel strip is less than 30 MPa for Rp and/or Rm.

28. The steel strip according to claim 25, wherein the hot dip galvanised steel strip has ultimate tensile strength Rm of 650-1160 MPa and/or 0.2% proof strength Rp of 300-700 MPa after temper rolling and wherein the difference between the middle and the edges of the steel strip is less than 60 MPa for Rp and/or Rm.

29. The steel strip according to claim 25, wherein the hot dip galvanised steel strip has ultimate tensile strength Rm of 700-1150 MPa and/or 0.2% proof strength Rp of 300-700 MPa after temper rolling and wherein the difference between the middle and the edges of the steel strip is less than 60 MPa for Rp and/or Rm.

30. The steel strip according to claim 29, wherein the difference between the middle and the edges of the steel strip is less than 40 MPa for Rp and/or Rm.

31. The steel strip according to claim 29, wherein the difference between the middle and the edges of the steel strip is less than 30 MPa for Rp and/or Rm.

32. The steel strip according to claim 25, wherein the hot dip galvanised steel strip has ultimate tensile strength Rm of 730-1130 MPa and/or 0.2% proof strength Rp of 300-700 MPa after temper rolling and wherein the difference between the middle and the edges of the steel strip is less than 60 MPa for Rp and/or Rm.

33. The steel strip according to claim 31, wherein the difference between the middle and the edges of the steel strip is less than 40 MPa for Rp and/or Rm.

34. The steel strip according to claim 31, wherein the difference between the middle and the edges of the steel strip is less than 30 MPa for Rp and/or Rm.

35. A high strength hot dip galvanised steel strip consisting, in mass percent, of the following elements:
  0.145-0.18% C
  1.50-2.10% Mn
  0.390-0.8% Si
  0.406-0.619% Al
  0.001-0.04% P
  0.0019-0.004% B
  0.05-0.20% V
  max. 0.015% N
  max. 0.05% S
  and, optionally, one or more elements selected from:
    max. 0.04% Ca
    max. 0.10% Nb
    max. 0.50% Cr
    max. 0.20% Mo
    max. 0.20%, Ni
    max. 0.20% Cu
    max. 0.20% Ti
  wherein the amount of Al+Si is 0.80-1.20 mass %,
    the balance of the composition consisting of Fe and inevitable impurities,
  wherein the strip has undergone a cold rolling reduction of 40% or more starting from a hot rolled thickness of 2.0-4.0 mm, and wherein vanadium precipitates are present in the hot rolled strip after annealing of the strip; and
  wherein the hot dip galvanised steel strip has an ultimate tensile strength Rm of 731 to 1104 MPa and A80 total elongation of 13.4 to 23.5% after annealing of the strip.

36. The steel strip according to claim 35, wherein the amount of V is 0.06-0.172 mass %,
   wherein vanadium precipitation did not occur as the strip had undergone the cold rolling reduction of 40% or more starting from the hot rolled thickness of 2.0-4.0 mm, and
   wherein the annealing which the strip had undergone was with an annealing soak temperature between 770 and 880° C. after the hot rolling and cold rolling of the steel strip.

* * * * *